3,677,703
METHOD OF PURIFYING HYDRATES OF CALCINED DOLOMITE AND MAGNESITE
Leonard John Minnick, Cheltenham, Pa., assignor to G. & W. H. Corson Inc., Plymouth Meeting, Pa.
Filed July 14, 1970, Ser. No. 54,686
Int. Cl. C08f 11/02
U.S. Cl. 23—186       5 Claims

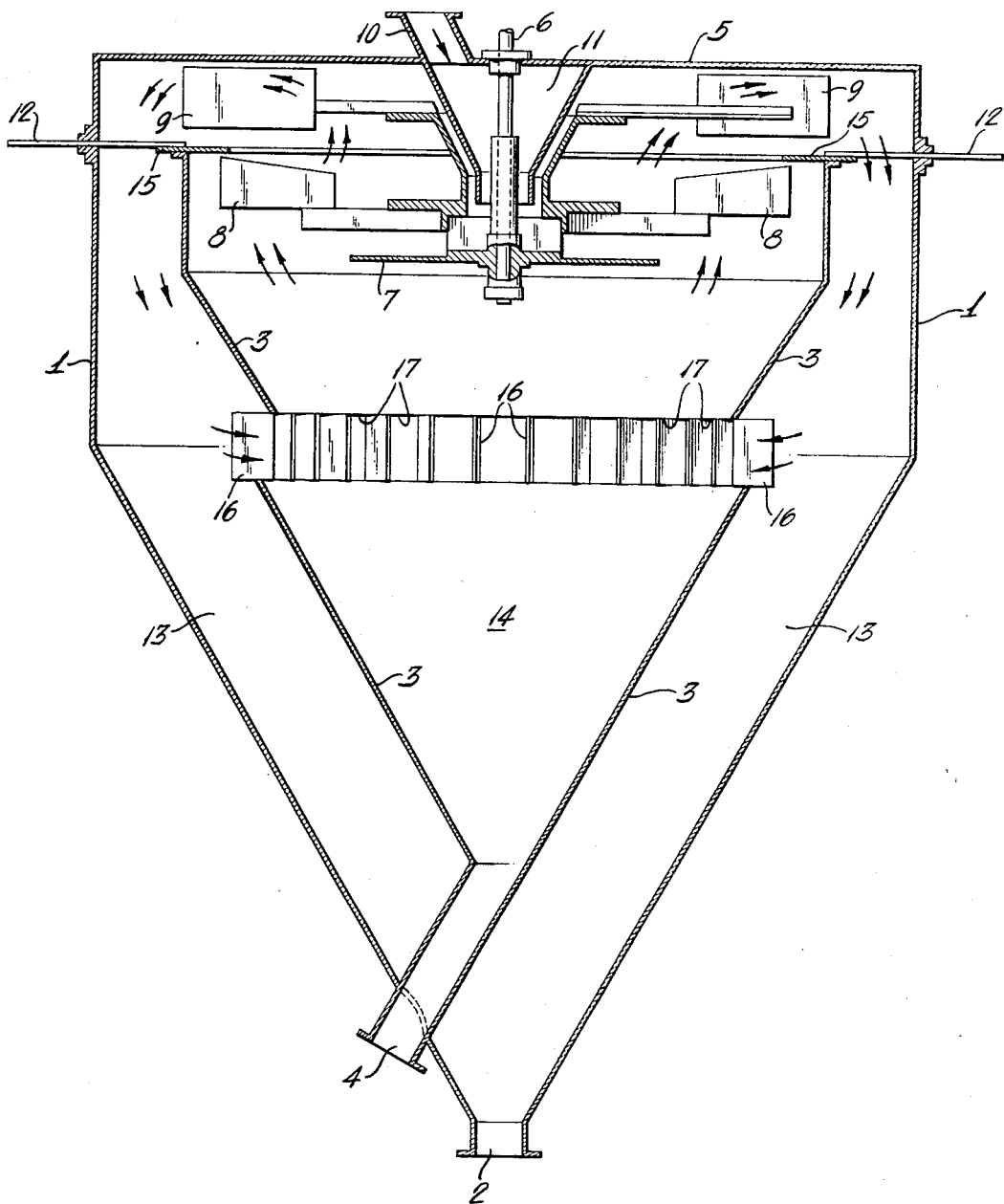

ABSTRACT OF THE DISCLOSURE

Dry, dihydrated calcined dolomite or dry hydrated calcined magnesite, having a particle size distribution such that at least the major portion and up to about 95% thereof, is −325 mesh and the remainder is larger than 325 mesh, is dispersed into an upwardly moving stream of air, in a confined zone, adapted in conjunction with centrifugal force acting primarly on the larger particles selectively to carry a fine fraction of the hydrate upwardly and outwardly to a zone separate and distinct from that to which the remainder is directed, and the fine fraction, which has a lower silica content than that of the original hydrate is separately recovered.

BACKGROUND OF THE INVENTION

Dolomite (or dolomitic limestone) is a natural, intimate molecular mixture of calcium carbonate and magnesium carbonate. The two carbonates are in an approximately 1:1 molar ratio, the exact proportion ranging, depending upon source, from about 40 to about 60% of each on a molar basis. Magnesite is a natural magnesium carbonate. Such natural materials usually contain a significant quantity of minor constituents, principally silica, alumina and iron oxide, as impurities. Of these impurities, the constituent which gives the most concern is the silica content since numerous uses for these magnesium-containing materials are involved with chemical reactions where the silica may produce a deleterious result. For example, when dolomite or magnesite (calcined) is used in the manufacture of refractories, the presence of silica affects the refractoriness and service-life of the refractory, necessitating the use of calcined dolomites or magnesites of a high degree of purity and a very low silica content. In the use of calcined dolomite for the manufacture of magnesium oxide by the sea water process, the silica ends up as an impurity in the finished product in a concentration nearly twice that in the original dolomite. Furthermore, it combines with calcium oxide and thereby adds further undesirable impurity in the production of the sea water magnesia. The available sources of natural dolomite and magnesite which are sufficiently pure with respect to silica to be usable in the foregoing applications are quite limited, and only a few deposits are known that are acceptable in this respect.

Attempts have been made over the past years to remove silica and other impurities from dolomite. These attempts are usually dependent upon the comminution of the raw dolomitic stone and the subsequent treatment thereof either by means of specific gravity separation, such as heavy media separation, or by the use of electrostatic precipitators. These methods have not achieved significant success in commercial practice since the amount of purification that can be obtained is small in relation to the process requirements. For example, if the rate of feed of a comminuted dolomitic limestone through electrostatic rolls is held to an extremely small rate, the dolomitic material can be separated into two fractions showing slight differences in silica content. Some purification has also been reported based on the calcination of raw dolomite and the subsequent slaking of the calcined material in a surplus of water. In the slaked material, the silica, usually in the form of crystalline quartz, was reduced by mechanical screening of the wet slurry. The disadvantage of this process, however, is obvious in that the formation of a wet slurry offers severe limitations from the standpoint of commercial applications which require that dolomite be supplied in dry condition.

It is the principal object of this invention to provide a process for purifying dolomitic and magnesitic materials by which the silica content is substantially reduced.

It is another object of the present invention to provide a process for purifying dolomitic and magnesitic materials by which the alumina content is reduced along with the substantial reduction in the silica content.

Still another object of the present invention is to provide a dry process for purifying dolomitic and magnesitic materials wherein the resulting treated material is dry and not encumbered by the presence of free water.

These and other objects will become apparent from a consideration of the following specification and claims.

The present invention is based upon the discovery that a dry, finely-divided dihydrated calcined dolomite and a dry finely-divided hydrated calcined magnesite can be subjected to air classification by suspension in a stream of air in a highly dispersed condition to provide a fraction having a lower silica content than that of the original starting hydrate.

Hence, the method of the present invention, comprises dispersing a dry, dihydrated calcined dolomite or hydrated calcined magnesite having a particle size distribution such that the major portion and up to about 95% thereof is −325 mesh (mesh sizes referred to herein are Tyler) and the remainder is larger than 325 mesh, into an upwardly moving stream of air, in a confined zone, adapted in conjunction with centrifugal force acting primarily on the larger particles selectively to carry a fine fraction consisting of at least the major portion and up to about 95% of the hydrate upwardly and outwardly to a zone separate and distinct from that to which the remainder is directed, separately recovering said fine fraction and separately recovering said remainder and removing said fine fraction and said remainder separately from the system. The resulting fine fraction will be found to be very low in silica as compared to the silica content of the starting material.

BRIEF DESCRIPTION OF THE DRAWING

The invention will be more readily understood from a consideration of the drawing which is a schematic, elevational view, in section, of one form of apparatus that may be used in accordance with the present invention.

THE PREFERRED EMBODIMENTS

As stated, one starting material for the present process is a dry, finely-divided dihydrated dolomite, that is, it is a hydrated, calcined dolomite in which substantially all of the calcium exists in the form of calcium hydroxide and in which at least the major portion, and preferably substantially all, of the magnesium exists as magnesium hydroxide. Such a dihydrate may be prepared by hydrating calcined dolomite by any one of several well-known procedures. The calcine itself, of course, must be one in which substantially all of the calcium and magnesium therein exist as their respective oxides, and the calcine will have a very low loss on ignition. One procedure and apparatus in which such a calcine may be formed is disclosed in U.S. Pat. No. 3,250,520. Calcination according to this patent results in a soft-burned calcine; that is, one which has been heated just to the point where all carbonate has been converted to oxide and not beyond. Such soft burned dolomite is a "highly active lime" according to ASTM C–110, Sections 20–22 in that it is completely reacted in less than 10 minutes and preferably in less than 5 minutes. Soft burned materials are the preferred materials hydrated for treatment according to the present invention.

In hydrating the calcined dolomite, it is essential that substantially all of the calcium oxide be converted to calcium hydroxide and that at least the major portion, and preferably substantially all, of the magnesium oxide be converted to magnesium hydroxide. Various methods are available for performing a dihydration of this type, and the present invention is not concerned with the particular method of hydration employed. For example, the soft-burned material produced according to the process of the above-mentioned Pat. 3,250,520 can be hydrated under atmospheric conditions to produce a dolomite dihydrate in which substantially all the calcium oxide is converted to the hydroxide and in which the major portion of the magnesium oxide is converted to its hydroxide. Thus, given sufficient time, the calcined material may be sufficiently hydrated simply by standing in air.

On the other hand, the calcined dolomite could be hydrated with liquid water followed by spray drying to provide the dry, finely-divided hydrate.

Preferably, however, the calcined dolomite is hydrated with liquid water under superatmospheric steam pressure. This superatmospheric steam pressure may be developed at least in part, and preferably entirely, by the exothermic heat generated through reaction between the respective oxides and added water. In one such pressure hydrating method, disclosed in U.S. Pat. 2,309,168, the calcined material is hydrated in the presence of liquid water in excess of that required for reaction with the respective oxides, and the resulting dihydrate is substantially instantaneously dried by effecting a finely-divided dispersion of the particles in an atmosphere under conditions causing the substantially instantaneous conversion to the vapor phase of the excess liquid water. This may be accomplished by delivering the hot, wet dihydrated dolomite under pressure, to an exit from the pressure hydrator where it is substantially instantaneously released into the normal atmosphere which causes flash vaporization of the excess liquid water resulting in a dispersion of dry, finely-divided dihydrated dolomite particles which are collected. As stated, this is disclosed in U.S. Pat. No. 2,309,168, and the disclosure of that patent is incorporated herein by reference.

The other starting material is hydrated calcined magnesite, that is a calcined magnesite in which substantially all of the magnesia therein exists in the form of magnesium hydroxide. What has been said above concerning calcination and hydration of dolomite is generally applicable to magnesite, except that calcined magnesite is normally hydrated with steam under superatmospheric steam pressure.

By virtue of the hydration of the calcined dolomite or magnesite, which itself is in substantially finely-divided form prior to hydration, the resulting hydrate is in very finely-divided form. That is to say, at least the major portion thereof and up to about 95% thereof is −325 mesh. The remainder of the material is larger than 325 mesh, but substantially entirely all thereof will pass through a 4 mesh screen. When calcined dolomite is hydrated according to the procedure of Pat. 2,309,168 from about 75 to about 95% thereof is −325 mesh, depending upon the nature of the calcination. For example, hydration of material calcined according to U.S. Pat. No. 3,250,520 can result in a hydrate having up to 95% of −325 mesh material. The +325 mesh material consists mainly of unhydrated quicklime, core (underburned limestone) and overburned material. Apparently the silica and alumina impurities are largely associated with these materials.

According to the present invention, the dry, finely-divided hydrate is subjected to air classification. In this procedure, the material is dispersed generally radially outwardly in a generally horizontal path from a central site into a generally upwardly moving stream of air. Fine particles become entrained in this moving stream of air to a greater extent than do the more coarse particles which, by virtue of their size and higher specific gravity, tend to be directed more in a horizontal direction than in a vertical direction with the upwardly moving air stream. This characteristic is made use of to separate a fine fraction from a more coarse fraction whereby the fine fraction is directed upwardly and outwardly to a zone separate and distinct from that to which the remainder, comprising the more coarse particles, is directed. The fine fraction may be then separately recovered and removed from the system, and will be found to be very low in silica and also to have a reduced alumina content as compared to that of the original starting material. The remainder is likewise separately recovered and removed from the system.

The drawing represents a schematic, side elevational view in section of a conventional air classifier which may be employed in accordance with the present invention. It consists of an outer annular wall 1 and an inner annular wall 3 defining an outer annular chamber 13. A suitable cover 5 is provided through which extends rotatable shaft 6 (attached to a suitable drive mechanism, not shown) which in turn rotates distributing plate 7, lower or bottom fan members 8 and upper or top fan members 9. Rotation of upper fan members 9 causes air to flow upwardly in inner chamber 14 as shown by the double arrows. This air flow passes upwardly past distributing plate 7 and lower fan members 8, outwardly past upper fan members 9 and downwardly through annular chamber 13. In passing into annular chamber 13, the air stream passes through a space provided between the outer edge of plates 15 and wall 1, this space being adjustable, for example, by moving plates 15 toward or away from wall 1 by means of rods 12. The air stream passes from annular chamber 13 back into inner chamber 14 through openings 16 and air vanes 17. Plates 15, as stated, are adjustable to provide, together with wall 1, an iris-like opening which may be altered to enlarge or diminish the entrance to annular chamber 13 and hence the rate of air flow. The lower or bottom fan members 8 rotate close to and slightly below the inner edge of plates 15.

In treating the dry hydrate in accordance with the present invention and in apparatus of the type shown in the drawing, it is fed through conduit 10 into chute 11 passing around central shaft 6 and dropping onto the rapidly revolving or rotating distributing plate 7 which whirls it off into the upwardly flowing air stream as a fine dispersion. The upwardly moving air stream carries fine particles of a size to be entrained therein upwardly in chamber 14 and outwardly past fan members 9 and thence downwardly into outer annular chamber 13 where they may be separately recovered and removed from the system through exit 2. Larger and heavier particles by virtue of the centrifugal force imparted to them by distributor plate 7, and aided by lower fan members 8, are directed more outwardly in a generally horizontal direction toward wall 3 beneath plates 15 from where they fall through inner chamber 14 and are separately recovered and removed from the system through exit 4. Thus, the larger and heavier particles are restrained from rising with the upwardly moving current of air as do the bulk of the finer particles and are, instead, forced against the inner surface of the inner annular wall 3. This selective entrainment of the finer particles is continuous so long as central shaft 6 and the members attached thereto are rotated and dry hydrate is fed through conduit 10.

The proportion of fine fraction obtained through exit 2 to relatively coarse fraction obtained through exit 4 can be controlled by adjustment of the velocity of the air flow as through controlling the speed of rotation of central shaft 6, the number of fan members 8 and the size of the opening provided between plates 15 and wall 1. In accordance with the present invention, these variables are selectively controlled to provide a fine fraction, collected through exit 2, consisting of at least about 5% and up to about 95% of the original dry, finely-divided hydrate. The exact proportion of fine fraction provided by the control of the stated variables may depend upon the purity and nature of the product desired of the fine fraction and on production demands. In any event the recovered fine fraction will be reduced in silica content as compared to the original dry hydrate starting material and will also have a significant decrease in its alumina content.

Air classification of dry, finely-divided materials is often used in conjunction with a grinding operation to separate fines from "tailings" so that the tailings may be recycled and reground without a cushioning effect of a large amount of fine material. For example, the assignee of the present invention has used air classification for several years as part of its tube-milling of dihydrated calcined dolomite in a "closed-circuit grinding" operation to recycle tailings to the mill for further grinding. The ultimate product, of course, has been a fine, dry dihydrated calcined dolomite having the same composition, including silica and alumina content, as the original dry, dihydrated calcined dolomite starting material. Much the same thing has been done with a monohydrated calcined dolomite where purification of the product was not a consideration but where the tailings have been milled and all but the most coarse lumps from the mill remixed with the fines from the air classifier. There is no grinding or milling of the hydrate according to the present process, as such would defeat the purpose of the present process, and, of course, the coarse fraction is not recycled for mixing with the fine fraction after grinding or milling.

The present process for purifying dolomite and magnesite has the advantage over heavy media separation in that it does not require expensive liquid plus its removal, drying, and so on. It has the advantage over wet sieving in that it does not require water followed by the removal of water and drying. Dry screening can't be employed because of difficulties due to agglomeration of the particles and recarbonation of the hydrate.

The resulting purified product can be used as such. On the other hand, it may be recalcined to form a pure oxide grain as by compressing the purified hydrate into small bodies, like nodules or pellets, and calcining. Depending upon the temperature of calcination, this material can be either a very reactive grade for use in steel making or it may be a very inactive grade (dead-burned) for use as a refractory material.

The invention will be more readily understood from a consideration of the following examples which are given for the purpose of illustration only and are not to be considered as limiting the scope of the invention in any way.

Example 1

In this example the starting material is a dihydrated calcined Pennsylvania dolomite in which essentially all of the lime and magnesia is hydrated and having an approximately 1:1 mol ratio of calcium hydroxide to magnesium hydroxide. It contains 0.78% $SiO_2$, 0.29% $Al_2O_3$, and 1.76% total impurities ($SiO_2$, $Al_2O_3$ and $Fe_2O_3$), and has the following sieve (Tyler) analysis:

Percent through—
```
    16 mesh _____ 97.8
    30 mesh _____ 96.1
    50 mesh _____ 93.7
    100 mesh _____ 91.2
    200 mesh _____ 88.6
    325 mesh _____ 82.0
```

The dihydrated calcined dolomite is prepared by calcining dolomitic limestone in a shaft kiln to convert all the carbonate to the respective calcium and magnesium oxides, grinding the calcined material to —10 mesh, mixing the ground material rapidly with excess water in a pressure chamber where the temperature, by virtue of the exothermic heat of the reaction, reaches about 300° F. (60–70 p.s.i.g. steam pressure), holding the material under these conditions for about 20 minutes, and then "flashing" or "exploding" the wet material into the normal atmosphere where the excess water evaporates forming a finely-divided dry hydrate, much like spray drying.

The dihydrated calcined dolomite is fed into an air classifier generally as shown in the drawing, adjusted to provide a fines fraction delivered through outlet 2 amounting to 68%, by weight, of the whole and a coarse fraction ("tailings") delivered through outlet 4 amounting to 32% of the whole.

The characteristics of the resulting products are as follows:

|  | Fine | Coarse |
|---|---|---|
| Percent of whole | 68 | 32 |
| Sieve analysis: |  |  |
| Percent through 16 mesh | 100.0 | 93.8 |
| Percent through 30 mesh | 99.9 | 88.3 |
| Percent through 50 mesh | 99.8 | 79.6 |
| Percent through 100 mesh | 99.8 | 68.5 |
| Percent through 200 mesh | 99.7 | 59.4 |
| Percent through 325 mesh | 99.2 | 46.7 |
| $SiO_2$ (percent) | 0.27 | 2.25 |
| $Al_2O_3$ (percent) | 0.00 | 0.40 |
| Total impurities (percent) | 0.78 | 3.16 |

Example 2

The procedure of Example 1 is repeated with, however, the classifier being adjusted to deliver a fine fraction amounting to 74% and a coarse fraction ("tailings") amounting to 26%.

The characteristics of the resulting products are as follows:

|  | Fine | Coarse |
|---|---|---|
| Percent of whole | 74 | 26 |
| Sieve analysis: |  |  |
| Percent through 16 mesh | 100.0 | 92.0 |
| Percent through 30 mesh | 100.0 | 85.7 |
| Percent through 50 mesh | 99.9 | 77.1 |
| Percent through 100 mesh | 99.9 | 66.7 |
| Percent through 200 mesh | 99.7 | 57.5 |
| Percent through 325 mesh | 96.6 | 49.5 |
| $SiO_2$ (percent) | 0.35 | 1.93 |
| $Al_2O_3$ (percent) | 0.14 | 0.26 |
| Total impurities (percent) | 1.52 | 3.85 |

Example 3

Impure magnesite is calcined at 1500° F. The resulting impure magnesia is then hydrated with steam in an autoclave for about an hour at 100 p.s.i. steam pressure. The resulting impure hydrate is then subjected to air separation in an air separator adjusted to deliver a fine fraction amounting to 87.8%, by weight of the whole and a coarse fraction amounting to 12.2%. Whereas the original hydrate has a silica content of 5.2%, the fine fraction has a silica content of only 1.0% and the coarse fraction has a silica content of 36.1%.

Modification is possible in selection of materials and procedural techniques without departing from the scope of the invention.

What is claimed is:

1. The method of reducing the silica and alumina content of dry, finely divided hydrated oxides selected from the group consisting of dihydrated calcined dolomite in which substantially all of the calcium oxide content therein exists in the form of calcium hydroxide and at least the major portion of the magnesium oxide content therein exists as magnesium hydroxide, and hydrated calcined magnesite in which substantially all of the magnesium oxide content therein is in the form of magnesium hydroxide, said dry finely divided hydrated oxides having a particle size distribution such that the major portion and up to about 95% thereof is —325 mesh and the remainder is larger than 325 mesh and contains the major portion of silica and alumina impurities, which comprises dispersing said dry hydrate into an upwardly moving stream of air, in a confined zone, adapted in conjunction with centrifugal force acting primarily on the larger particles selectively to carry a fine fraction consisting of at least the major portion and up to about 95% of the hydrate upwardly and outwardly to a zone separate and distinct from that to which the remainder is directed; separately recovering said fine fraction, separately recovering said remainder and removing said fine fraction and said remainder separately from the system.

2. The method of claim 1 wherein from about 75 to about 95% of the hydrate is —325 mesh.

3. The method of claim 1 wherein said dihydrated calcined dolomite prepared by hydrating dolomitic quicklime under superatmospheric steam pressure.

4. The method of claim 3 wherein said dolomitic quicklime is hydrated with just sufficient water required to react with the quicklime resulting in a dry dihydrate.

5. The method of claim 3 wherein said dolomitic quicklime is hydrated by hydrating the calcium oxide content and at least the major portion of the magnesia under pressure and in the presence of water in excess of that which will combine as water of hydration and then substantially instantaneously drying the resulting hydrated calcined dolomite by effecting a finely divided dispersion thereof into an atmosphere under conditions causing the substantially instantaneous conversion to the vapor phase of excess water.

References Cited

UNITED STATES PATENTS

| | | | |
|---|---|---|---|
| 2,611,683 | 9/1952 | Knibbs | 23—188 |
| 2,408,647 | 10/1946 | Huntzicker et al. | 23—188 |
| 2,356,760 | 8/1944 | Garvin | 23—188 |
| 1,872,565 | 8/1932 | Sturtevant | 209—139 |
| 3,062,458 | 11/1962 | Dearing | 209—138 X |

FOREIGN PATENTS

| | | | |
|---|---|---|---|
| 643,451 | 9/1950 | Great Britain | 23—186 |

OSCAR R. VERTIZ, Primary Examiner

G. A. HELLER, Assistant Examiner

U.S. Cl. X.R.

23—188; 209—139